Jan. 2, 1968 W. H. VAN DEN TOORN 3,361,297
DEVICE FOR TAKING OFF CAPSULES FROM A STACK
Filed May 17, 1966 6 Sheets-Sheet 1
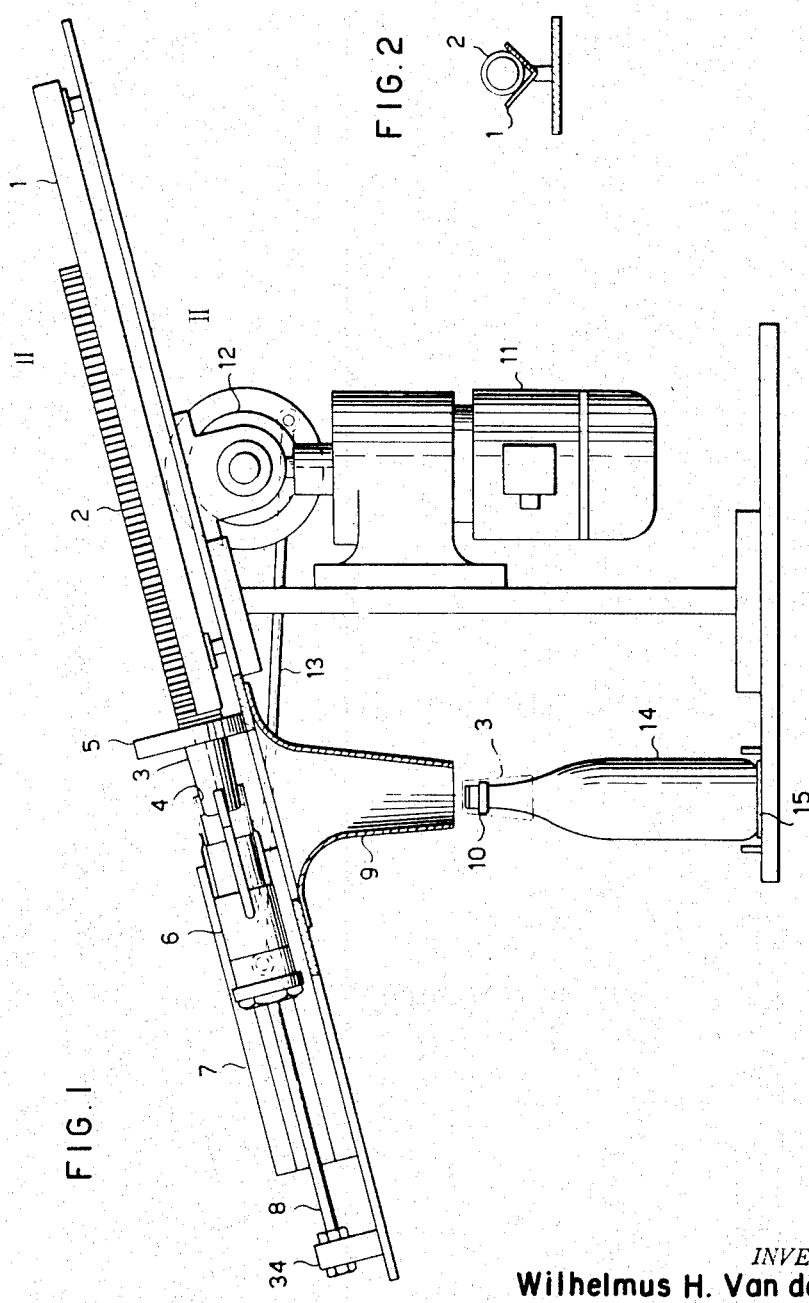
INVENTOR.
Wilhelmus H. Van den Toorn
BY
ATTORNEY

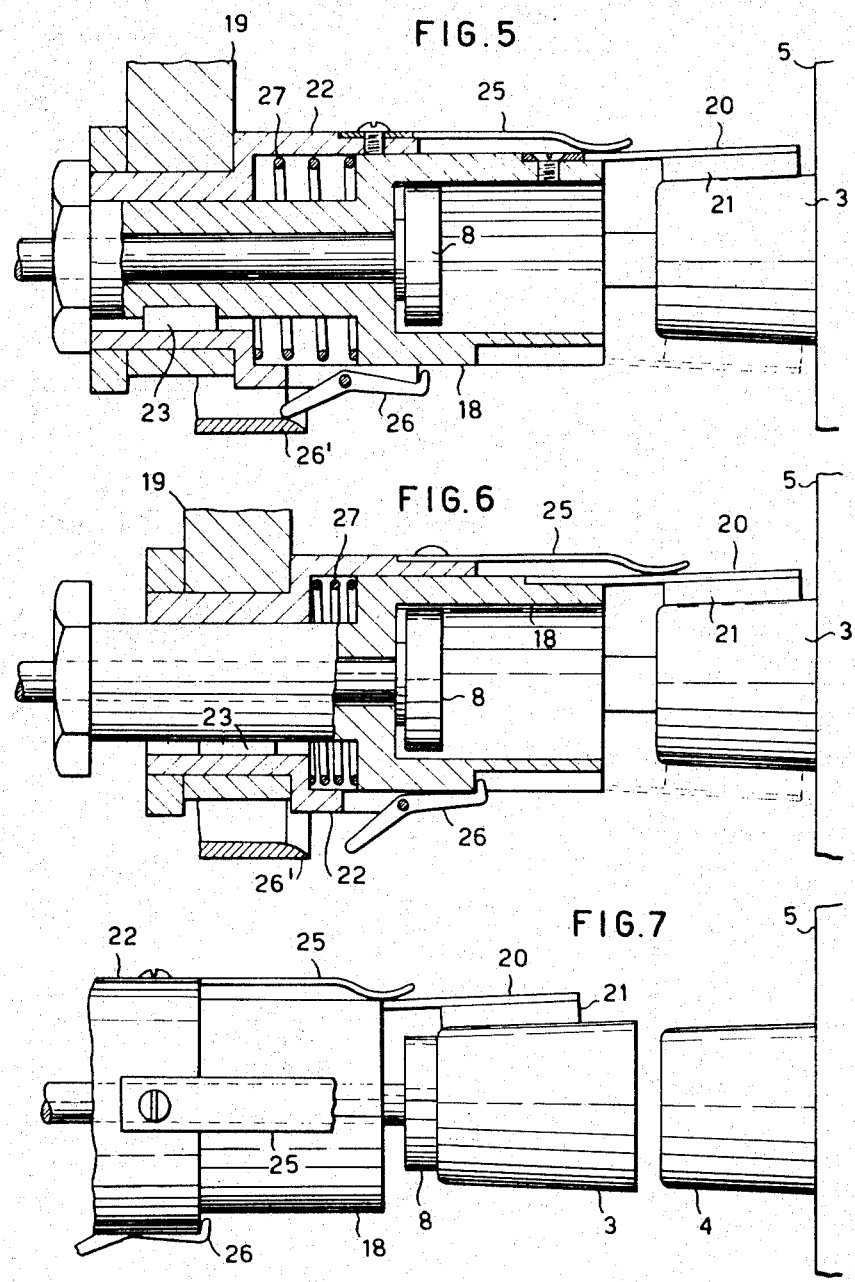

Jan. 2, 1968  W. H. VAN DEN TOORN  3,361,297
DEVICE FOR TAKING OFF CAPSULES FROM A STACK
Filed May 17, 1966  6 Sheets-Sheet 4

INVENTOR.
Wilhelmus H. Van den Toorn
BY
ATTORNEY

INVENTOR.
Wilhelmus H. Van den Toorn
BY
ATTORNEY

United States Patent Office 3,361,297
Patented Jan. 2, 1968

3,361,297
DEVICE FOR TAKING OFF CAPSULES FROM A STACK
Wilhelmus H. van den Toorn, Schiedam, Netherlands, assignor to N.V. W. H. van den Toorn's Industriele Ondernemingen Capsulefabriek "Holland," Schiedam, Netherlands
Filed May 17, 1966, Ser. No. 550,868
Claims priority, application Germany, May 22, 1965, N 26,771
15 Claims. (Cl. 221—217)

ABSTRACT OF THE DISCLOSURE

The invention relates to a device for taking off a capsule from a stack of capsules that are inserted one in each adjacent one, which device is provided with a gripper for gripping the last capsule of the stack and with a stop member for the rest of the stack.

Background of the invention

Capsules of the tin foil type, that may be of tin foil, aluminium or other thin materials often stick to each other in the stack and consequently it is difficult to take them off automatically in such a way that always one, but never none or more than one capsule is taken off.

Further it is of importance that the capsule is not damaged by the take off device.

In a known device a gripper is provided which engages the inner side of a capsule and cooperates with a clamp member, such that part of the rim of the capsule is clamped and taken away. Such a device is relatively complicated and consequently expensive to make or maintain and further it has a disadvantage that only a small part of the rim of the capsule is gripped, whereby this rim could be damaged. It is necessary that the capsule to be gripped is placed in a relatively accurately determined position. Especially with tin foil capsules difficulties can be expected, because such capsules generally are stacked with a high density. The fact that the pulling force is exerted at one side of the capsules can lead to deformation and jamming.

Summary of the invention

The invention aims at providing a device which is less complicated, devoid of the above mentioned disadvantages and suitable for handling tin foil capsules.

It is known to provide pneumatic devices in which a gas jet and suction are used for taking off the capsules. For such devices a pneumatic apparatus and a source of pressurized air are necessary. Further such pneumatic devices necessitate a predetermined spacing between the capsules which by reason of the transport of the preceding capsules is not always present. With tin foil capsules provided with a lacquer, which always sticks somewhat, this type of device is not sufficiently reliable.

The invention provides a device, which does not need pressurized air and is independent in a high degree from the density of the stack and which functions also when the capsules have somewhat sticking surfaces.

The above objects are attained according to the invention by making the gripper movable to and fro along a predetermined path and suitable for gripping the outer skirt surface of a capsule, and in that a rotating mechanism is provided for imparting a rotational movement to the gripper around the axis of a gripped capsule and by employing a retaining member which is a yieldable ring mounted coaxially with the capsule stack.

A good gripping action can be obtained according to a further elaboration of the invention in that the gripper is provided with yieldable gripping members and considerably stiffer pressure members which are movable with respect to the gripping members. Preferably the gripper is provided with the elastical gripper members, which are mounted concentrically and symmetrically with respect to the axis of the capsule to be gripped.

Brief description of the drawings

The above and further features of the invention will be elucidated in the following description relating to the accompanying drawings in which FIGURE 1 shows an elevation, partly in cross-section, of a device according to the invention;

FIGURE 2 shows a cross-section on the line of II—II of FIG. 1;

FIGURES 5, 6 and 7 elucidate the working of the gripper according to the invention;

Description of the preferred embodiments

Figure 3:
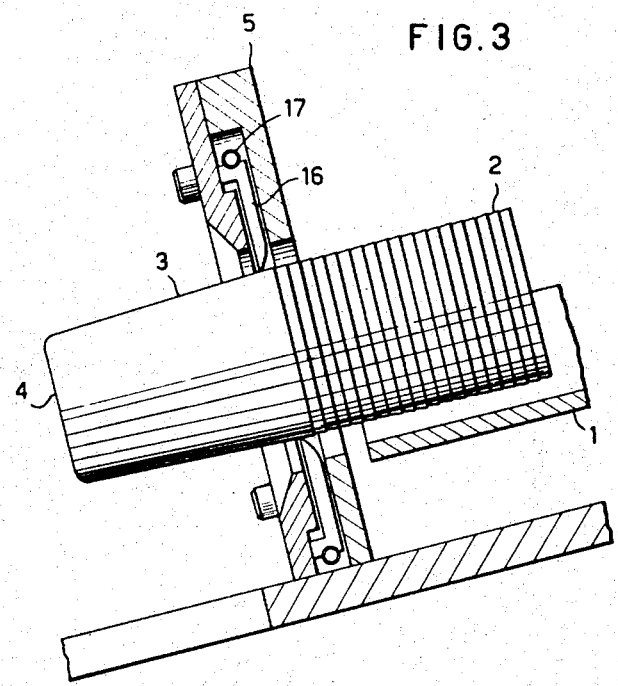
FIGURE 3 shows on an enlarged scale a cross-section through a detail.

In the drawing 1 indicates a tilting gutter in which a stack of capsules 2 is laid. It is also possible that this stack of capsules is fed into the gutter by conventional automatic means such as a drum or another transport system. The capsules are positioned with the closed ends at the lower side. The first capsule 3 of the stack protrudes with its closed part 4 through the elastic ring 5 with the exception of a length of a few millimetres which still remain as shown in FIGURE 1 at the right side of the ring 5. Opposite to the stack of capsules 2 and co-axial with it a gripper 6 is mounted on a slide 7.

In this gripper 6 an ejector stop 8 is mounted. The gripper 6 slides with respect to said gripper. A capsule taken off by the gripper and ejected by engaging the stop 8 falls in a guide 9 and is led to the mouth 10 of a bottle 14. By gravity the stacked capsules shift in the gutter somewhat downwardly and are ready to be removed.

The device is continuously driven by an electric motor 11 via a coupling 12 and a crank having a driving rod 13. A bottle 14, which arrives on a belt 15, is stopped in a conventional manner not immediately related to the invention, for instance by means of a lever controlled by an electromagnet, the coupling 12 is actuated by conventional means in such a way that the crankpin of the driving rod 13 rotates one full revolution.

Figure 4:
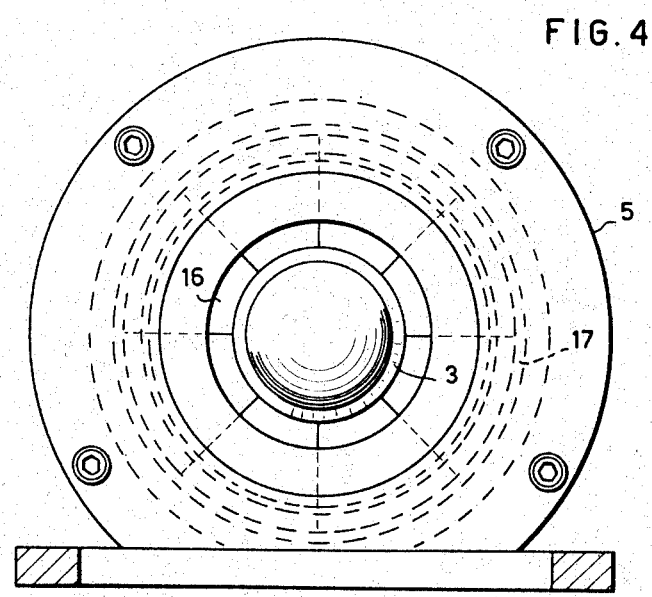
FIGURE 4 shows a view of the detail of FIGURE 3.

The elastic ring 5 (see FIGS. 3 and 4) consists of a number of segments 16, which are retained by a circular spring 17. The inner diameter of the segments 16 when engaging each other is smaller than the outer diameter of a capsule 3, such that a capsule 3, which is inserted in the opening between the segments 16 is retained at a distance of a few millimetres of its end. The segments 16 are movably positioned in a housing such that they can move in a radial and also partly in the axial directions. The latter movement involves a small pivotal movement with respect to spring 17. This small pivotal movement and allowance for it is not necessary for all sizes of capsules.

If the capsule 3 is taken off by the gripper 6 and withdrawn, the ring is opened somewhat. Immediately behind the capsule taken off the ring closes again and retains the following capsule.

In an alternative embodiment the ring consists partly of elastic material, for instance the material, commercially known by the trade name Vulkollan, but a segmented ring is preferred by reason of smaller wear and because of the possibility of more exact calibration. Further a segmented ring is adapted more easily to small irregularities in the capsule rim.

The gripper proper (FIGURES 5, 6 and 7) consists of a cylindrical sleeve 18 which carries at its end a number, for instance four, fingers 20 of steel which are provided at their ends with a rubber cushion 21. These cushions may be roughed or provided with ribs, protrusions and/or grooves for improving their frictional characteristics. In the free position the inner surface of the cushions mates almost exactly with the outer surface of a capsule as well with respect to the coneshape of the capsule, as with its length and diameter.

Around the sleeve 18 a second sleeve 22 is mounted in which sleeve 18 can slide. The sleeve 22 is coupled with sleeve 18 in the rotational direction by means of a key 23. Further the sleeve 22 is supported by a slide 19, which is attached to the driving rod 13 and by reason of this can be moved to and fro via the coupling 12 as seen in FIGURE 1.

As has been shown in FIGURES 5 and 6 the second sleeve 22 is provided with fingers 25 of steel, which are biased such, that, when the sleeves 18 and 22 are inserted in each other (position of FIGURE 6) they exert a pressure on the fingers 20 to press the cushions 21 against the capsule 3.

The sleeve 22 is provided with one or more tumbler stops 26, which interlock the sleeves 22 and 18 in their forward positions.

Within these sleeves an ejector stop 8 is present, which has been fixedly mounted to the frame 34, in which the slide 19 slides.

In the drawing FIGURE 5 shows the starting position; FIGURE 6 the position at the end of the forward movement and FIGURE 7 the position during the retracting movement of the gripper. When moving the slide 19 to the right side both sleeves 18 and 22 move to the right side until the sleeve 18 is stopped by the ejector stop 8, after which the spring 27 is compressed. By reason of this the sleeve 22 slides over the sleeve 18 so that the steel blade springs 25 press against the springs 22 forcing the cushions 21 to grip the capsule 3. In this position the tumbler stops 26 become active and interlock the sleeves 22 and 18. By means of a mechanism described further on both sleeves 18 and 22 are rotated round their axis at the beginning of the retracting movement in which a capsule 3 is taken off and carried away to the left. With further movement to the left the ejector stop 8 engages the head of the gripped capsule which then falls down and is ejected out of the gripper members 20, 21.

Figure 8:
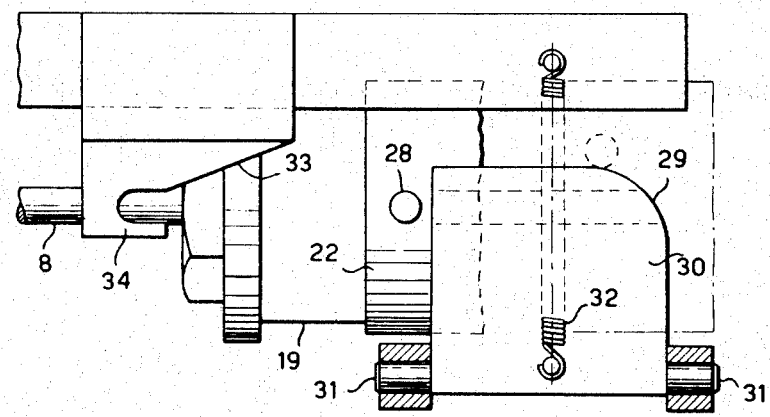
FIGURES 8 and 9 elucidate the rotating mechanism.
Figure 9:
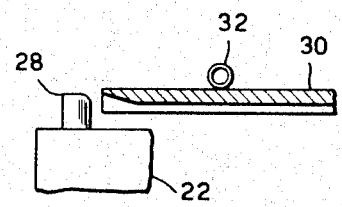

The rotating mechanism is further elucidated in figures 8 and 9. The cylinder 22 supports a radial pin 28. Within the region in which this pin moves, a plate 30 is pivotally mounted around a pen 31, which does not move to and fro with the gripper. The plate 30 by means of a spring 32 is kept in the path of movement of the pin 28. The plate 30 is provided with a guide path with a chamfered portion 33 by reason of which it is pivoted with respect to the pin 31 when the pin 28 passes. With the retracting movement pin 28 engages the rounded cam surface 29 of plate 30 and is diverted, by reason of which sleeve 22, and by means of key 23 also sleeve 18, are rotated at the beginning of the retracting movement. At the end of this retracting movement the pin engages the chamferred portion 33 of plate 30 by reason of which the sleeves 18 and 22 are rotated back in their starting position. This rather sudden rotating movement has proved to be very favourable for the proper operation of the device and experience has shown that capsules of very different type are reliably delivered one by one without failures.

An important advantage of the invention is, that the capsule is gripped over a relatively large surface at the outer side. By reason of this, capsules of rather different types such as aluminium capsules and tin foil capsules can be gripped with a high degree of reliability without deformations or damage.

Figure 10:
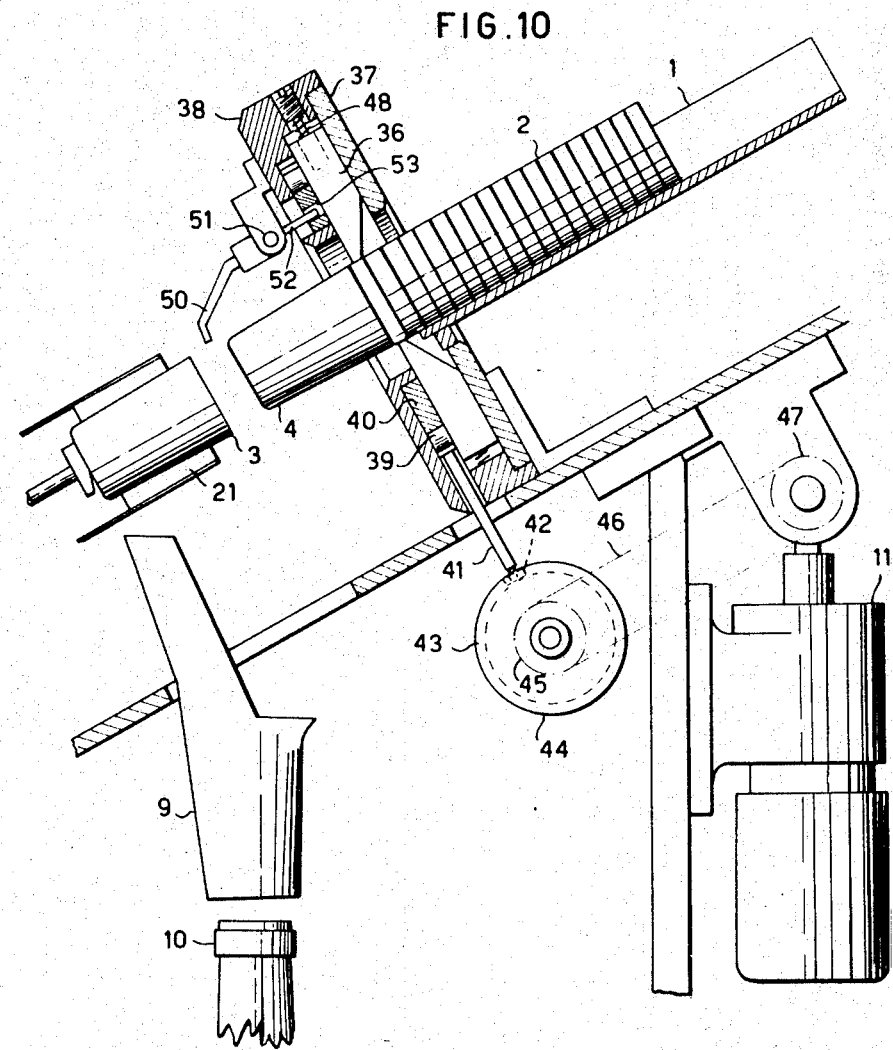
FIGURE 10 shows a part of a further embodiment of the invention provided with an improved retaining ring.
Figures 11, 12:
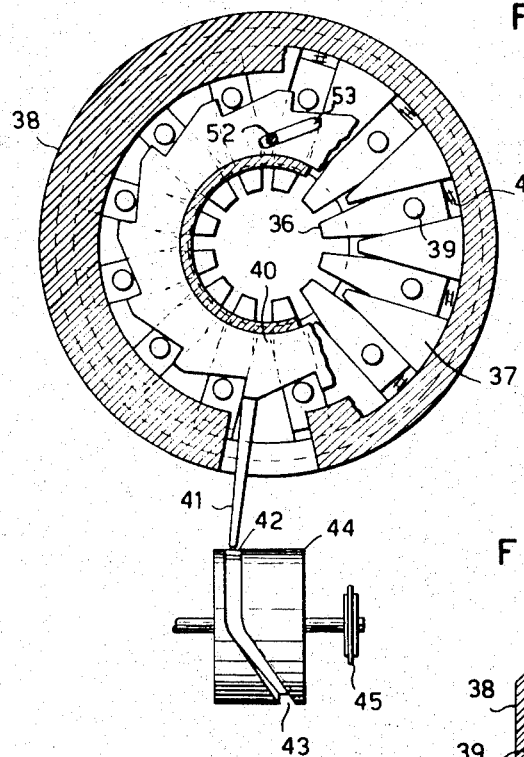
FIGURE 11 shows further details of such rings.
FIGURE 12 shows a partial cross-section of the ring shown in FIGURES 10 and 11.

FIGURES 10 through 12 show part of an embodiment of the invention, in which a controlled retaining ring is used. All equivalent parts of the invention which have the same function and working as in the embodiment of FIGURES 1 through 9 have been indicated with the same references. Machine parts, which are not necessary for elucidating the working of the controlled retaining ring and have not been modified with respect to FIGURES 1 through 9, have been omitted in FIGURES 10 through 12 for purposes of brevity.

In FIGURES 10 through 12 a ring-shaped housing 38 is shown containing spring biased segments 36, which are guided between fixedly mounted blocks 37 and can move in a radial direction. The segments 36 each are provided with a pin 39. Further a cam disc 40 is provided having a toothshaped outer circumference. The cam disc 40, which is rotatably mounted, is provided with a lever 41 bearing at its end a small pully which is inserted in a groove 43 of a cylinder 44 which is driven by means of chain wheels 45 and 47 and a chain 46. Chain wheel 47 is affixed to the shaft of the coupling driving the crank 13 shown in FIGURE 1. Further the cam disc 40 is provided with a slot 53 in which a lever 52 protrudes, that is pivotally mounted at 51 and is connected to stop lever 50 for the stack of capsules 2.

In FIGURE 12 each slidable segment 36 is shown provided with a bore in which a spring 48 is inserted that bears against a screw 49 attached by means of screw thread in an appropriate hole in the housing 38.

The working of the controlled ring shown in FIGURES 10 through 12 is the following: When the gripper 6 of FIGURE 1 is moved towards the stack of capsules 2 and the gripper grips the last capsule 4, the segments 36 are in position to engage and retain the end position of the capsule stack. Consequently the last capsule is retracted as earlier described, but during that movement the cylinder 44 is rotated. Due to the shape of groove 43 lever 41 is moved so that cam disc 40 is somewhat rotated after the taking off of a capsule. By reason of this:

The pin 52 slides in slit 53 so that lever 50 is pivoted and is brought in the path of the stack of capsules, The segments 36 are retracted because the toothshaped outer circumference of the cam disc 40 engages pins 39 and the stack of capsules is free to slide down until the last capsule is retained by lever 50.

Thereafter the lever 41 is moved back into the position of FIGURE 11 by reason of the shape of groove 43, so that the segments 36 grip again, but this time the next capsule of the stack.

In FIGURE 10 a capsule 3 has been shown in the gripper elements 21 for sake of clarity, but it will be clear that the position of the ring device and the stack of capsules with capsule 4 already beyond the segments 36 can occur only after firstly the elements 36 have been retracted, secondly the stack slid down until it engaged stop 50 and thirdly the segments 36 have again moved to grip the last but one capsule of the stack, so that gripper elements 21 moved further away from the stack than has been shown in FIGURE 10.

The advantage of the device according to FIGURES 10–12 is, that the capsules are gripped and retained with great security and reliability when the last of them has been gripped by the gripper 6 but on the other hand are not hampered in their downward movement when the stack of capsules has to slide one capsule place down. The force exerted by the segments 36 on the capsules can be adjusted by rotating screws 49 and the movement of the segments 36 can be made easily sufficiently large to accommodate important deviations in the dimension of the capsules. Also it is not necessary that the capsules in the stack have mutually exactly the same position, because if one capsule protrudes in a less degree in the preceding capsule this does not matter anyhow in view of the fact that the distance between the lever 50 in its lowered position and the segments 26 completely defines the position of the last capsule with respect to the segments 26.

What is claimed is:

1. A device for taking off a capsule at a time from a stack of capsules inserted in each other, comprising a yieldable ring, mounted axially with the end portion of the capsule stack; a gripper for gripping the end capsule of the stack, said gripper being mounted for reciprocating movement along a predetermined path parallel to the axis of the end portion of the stack and comprising means for gripping the outer skirt surface of the end capsule of the stack, said gripper provided with yieldable gripping members and a member mounted slidably parallel to said axis, said member provided with fingers adapted to press against the yieldable gripping members when said slidably mounted member slides in one direction parallel to said axis; and a rotating mechanism for rotating the gripper about said axis.

2. A device for taking off a capsule at a time from a stack of capsules inserted in each other, as claimed in claim 1, said fingers being elastic.

3. A device as claimed in claim 1, said rotating mechanism adapted to rotate the gripper over a predetermined angle at the beginning of the movement of said gripper away from the said guide.

4. A device for taking off a capsule at a time from a stack of capsules as claimed in claim 1, further comprising a guide for said stack, and a member having a cam surface and a stopping member (28) shaped and mounted with respect to the said gripper that they engage each other with the retracting movement of the gripper which causes said gripper to be rotated during said retracting movement.

5. A device as claimed in claim 1, further comprising a stopping member (28) connected to the said gripper, and a yieldable member mounted in the path of said stopping member so shaped, that with forward movement of the gripper it can be pushed out of the path of the stopping member and with retracting movement of the gripper engages said stopping member for imparting a rotating movement to the gripper.

6. A device as claimed in claim 1, said yieldable ring at least at its its inner side divided into a number of separate rigid segments biased by spring means in radial direction and mounted to provide some play at their inner side in the axial direction of the ring.

7. A device as claimed in claim 6, said segments having sharp inner edges.

8. A device as claimed in claim 6, the said segments biased in radial direction by spring means.

9. A device as claimed in claim 6, in which the ring has a sharp inner edge.

10. A device as claimed in claim 6, and means for controlled moving of the segments inwardly and outwardly.

11. A device as claimed in claim 10, said means containing a tooth shaped cam disc cooperating with the segments mounted rotatably with respect to the ring and coaxially therewith.

12. A device as claimed in claim 10, comprising insert means (50, 51, 52, 53) insertable controllably in the path of the capsules in the stack, said insert means coupled with said means controlling the radial movement of the segments such that, when the segments are moved outwardly the retaining means are moved into the path of the capsules in the said guide.

13. A device as claimed in claim 11, a double lever mounted coupled to said cam disc having one lever arm movable into the path of the capsules in thet said guide.

14. A device for taking off a capsule at a time from a stack of capsules inserted in each other, comprising a guide for said stack, a gripper for gripping the outer skirt surface of the end capsule of the stack, when in said guide, said gripper mounted for reciprocating movement in the direction of the said guide along a predetermined path, a driving means for driving reciprocating movements of said gripper, a rotating mechanism for imparting a rotating movement to the gripper around the axis of the said end capsule when in the guide, a yieldable ring mounted coaxially surrounding the said end capsule in the guide, the said gripper containing a first member supporting yieldable gripping members and a second member supporting pressure members for said gripping members, a stop for stopping the said second members in a position beyond its most forward position and means of engagement of the stopping members with the said second member to move both members with respect to each other.

15. A device as claimed in claim 14, the said first and second members of the gripper slidably mounted with respect to each other and connected to each other by spring means.

References Cited

UNITED STATES PATENTS

| | | | |
|---|---|---|---|
| 2,059,546 | 11/1936 | Brandenburg | 221—220 |
| 3,104,780 | 9/1963 | Carter et al. | 221—210 |

STANLEY H. TOLLBERG, *Primary Examiner.*